United States Patent
Chen et al.

(10) Patent No.: US 8,154,651 B2
(45) Date of Patent: Apr. 10, 2012

(54) IMAGE RECORDING APPARATUS AND CONTROL METHOD THEREOF

(75) Inventors: Yen-chao Chen, Tantz Shiang (TW); Jung-ching Wang, Tantz Shiang (TW)

(73) Assignee: Asia Optical Co., Inc., Taichung (TW)

( * ) Notice: Subject to any disclaimer, the term of this patent is extended or adjusted under 35 U.S.C. 154(b) by 555 days.

(21) Appl. No.: 12/424,779

(22) Filed: Apr. 16, 2009

(65) Prior Publication Data
US 2010/0085472 A1    Apr. 8, 2010

(30) Foreign Application Priority Data
Oct. 2, 2008    (TW) ............................... 97137947 A

(51) Int. Cl.
H04N 5/225    (2006.01)
(52) U.S. Cl. ........................................ 348/372; 348/165
(58) Field of Classification Search .................. 348/165, 348/372
See application file for complete search history.

(56) References Cited

U.S. PATENT DOCUMENTS

| | | | |
|---|---|---|---|
| 6,727,952 B1 * | 4/2004 | Hirata et al. | 348/372 |
| 6,925,574 B2 * | 8/2005 | Satoh | 713/323 |
| 7,764,478 B2 * | 7/2010 | Chishima | 361/63 |
| 2001/0028571 A1 * | 10/2001 | Hanada et al. | 363/50 |
| 2005/0219406 A1 * | 10/2005 | Ohsawa | 348/372 |

* cited by examiner

*Primary Examiner* — Philip B Tran

(57) ABSTRACT

Disclosed is an image recording apparatus capable of preventing maloperations when entering into sleep mode. The image recording apparatus comprises a display module, a detecting unit, a power supply unit, a first switch, a second switch and a control unit having an interrupt unit. The control unit controls the first switch in an on-state to supply power to the display module and the detecting unit and executes a corresponding operation. After an idle status of the image recording apparatus exceeds a predetermined time, the control unit disables the interrupt unit and controls the second switch in an on-state and the first switch in an off-state to supply power to the detecting unit via the second switch. After a default time, the control unit enables the interrupt unit, therefore, maloperations when entering into the sleep mode can be prevented.

20 Claims, 4 Drawing Sheets

IMAGE RECORDING APPARATUS AND CONTROL METHOD THEREOF

BACKGROUND OF THE INVENTION

1. Claim of Priority Under 35 U.S.C. §119

This application claims priority to Taiwanese Patent Application No. 097137947 filed on Oct. 2, 2008.

2. Field of the Invention

The present invention generally relates to an image recording apparatus, and more particularly to an image recording apparatus capable of preventing maloperations.

3. Description of Prior Art

For saving electricity consumption of an image recording apparatus, the image recording apparatus generally enters into sleep mode after an idle status in a default time. Once an object is entering into the target zone of the detecting unit of the image recording apparatus or the user starts operations, the image recording apparatus is activated from the sleep mode and enters into work mode. After entering into the work mode, the image recording or the corresponding operations according to the inputs from the user are executed.

When the image recording apparatus is entering into the sleep mode, the control unit inside the image recording apparatus switches the power supply to the detecting unit from the work mode to the sleep mode for saving the electricity consumption. Inside the image recording apparatus, the power supply to all units and modules is provided by a single power source. The electricity of the single power source is converted to kinds of appropriate voltages for all units and modules respectively and then provided thereto. When the image recording apparatus enters into the sleep mode, the power supply is switched from the work mode to the sleep mode. All units and modules stop power supply thereto with respective control switches but the detecting unit. However, at the moment of turning off the control switch, the output load of the power supply drops enormously and instantaneously. Therefore, a transient pulse occurs in a period. As shown in FIG. 1, T represents the time length of the transient pulse occurrence. Such transient pulse occurrence can cause false trigger of the detecting unit, and then the image recording apparatus operates corresponding to the false trigger, consequently, some incorrect recording operations may be executed. Moreover, due to the false trigger, the image recording apparatus cannot enter into the sleep mode for saving electricity consumption.

SUMMARY OF THE INVENTION

An objective of the present invention is to provide an image recording apparatus and control method thereof to prevent false trigger as controlling switches, therefore, the image recording apparatus can enter into the sleep mode smoothly to save electricity consumption.

For accomplishing aforesaid objective of the present invention, the present invention provides an image recording apparatus capable of preventing maloperations when entering into the sleep mode. The image recording apparatus comprises a display module, a detecting unit, a power supply unit, a first switch, a second switch and a control unit having an interrupt unit. The power supply unit supplies power to the display module and the detecting unit. The first switch is coupled with the display module, the detecting unit and the power supply unit to determine open or short between the power supply unit and the display module, between the power supply unit and the detecting module. The second switch is coupled with the power supply unit and the detecting unit to determine open or short between the power supply unit and the detecting unit.

The control unit further comprises an interrupt unit. The control unit controls the first switch in an on-state to supply power to the display module and the detecting unit and executes a corresponding operation when the image recording apparatus is activated. After an idle status of the image recording apparatus exceeds a predetermined time, the control unit disables the interrupt unit and controls the second switch in an on-state and the first switch in an off-state to supply power to the detecting unit via the second switch. After a default time, the control unit enables the interrupt unit.

The present invention also provides a control method of an image recording apparatus. The control method comprises steps described below: confirming whether an idle status of the image recording apparatus exceeds a predetermined time in work mode; and executing a pre-operation of sleep mode when exceeding the predetermined time. The pre-operation of sleep mode further comprises steps described below: disabling the interrupt unit; controlling the second switch in an on-state, then controlling the first switch in an off-state to supply power to the detecting unit via the second switch with the power supply unit; and enabling the interrupt unit after controlling the first switch in the off-state in a default time.

The present invention further provides a control method of an image recording apparatus comprising steps of: confirming if an idle status of the image recording apparatus exceeds a predetermined time in work mode; and executing a pre-operation of power saving mode as exceeding the predetermined time. Similarly as aforementioned, the pre-operation of sleep mode further comprises steps described below: disabling the interrupt unit; controlling the second switch in an on-state, then controlling the first switch in an off-state to supply power to the detecting unit via the second switch with the power supply unit; and enabling the interrupt unit after controlling the first switch in the off-state in a default time.

DETAILED DESCRIPTION OF THE INVENTION

Figure 1:
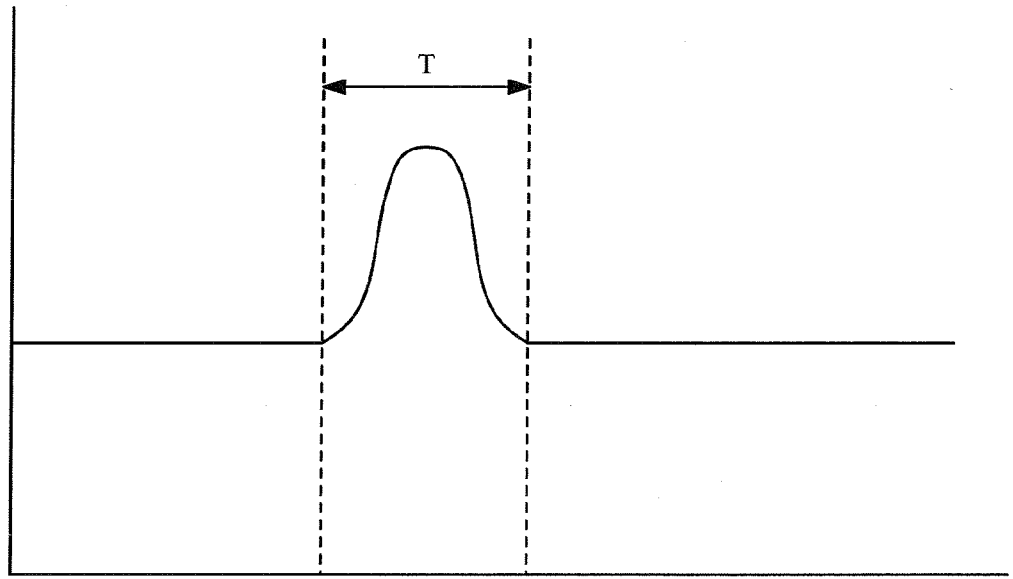
FIG. 1 depicts a diagram of a transient pulse occurrence.
Figure 2:
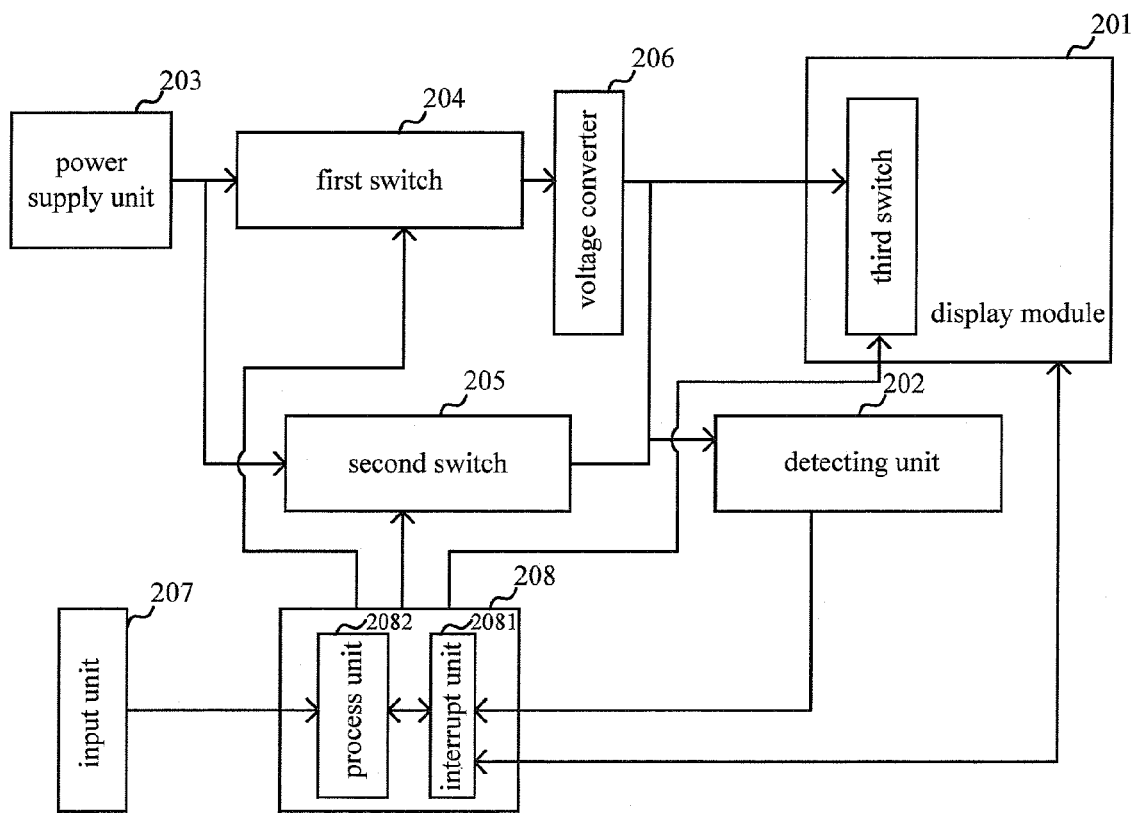
FIG. 2 depicts a block diagram of an image recording apparatus according to an embodiment of the present invention.

Please refer to FIG. 2, which depicts a block diagram of an image recording apparatus according to an embodiment of the present invention. The image recording apparatus of the present invention comprises a display module 201, a detecting unit 202, a power supply unit 203, a first switch 204, a second switch 205, a voltage converter 206, an input unit 207 and a control unit 208. The display module 201 is coupled with the voltage converter 206. With the power provided by the voltage converter 206, the display module 201 can be operated to display menu lists or image data recorded by the image recording apparatus.

The detecting unit 202 is utilized for detecting statuses of a target zone. A trigger is generated by detecting a change of the target zone. In this embodiment, a PIR (pyroelectric infrared sensor) can be illustrated for the detecting unit 202. Once any object is entering into the target zone, the PIR is capable to detect a temperature change of the target zone caused by the object and generate the trigger to the control unit 208.

The power supply unit 203 is utilized to supply power to the display module and the detecting unit. A battery can be illustrated for the power supply unit 203 in the present invention.

The first switch 204 is coupled with the display module 201, the detecting unit 202 and the power supply unit 203. The first switch 204 determines open or short between the display module 201 and the power supply unit 203. Similarly, the first switch 204 determines open or short between the detecting unit 202 and the power supply unit 203. Therefore, the first switch 204 will stop the power supply to the display module 201 and the detecting unit 202 as the image recording apparatus entering into sleep mode. In this embodiment, the first switch 204 can be a switch circuit which includes a transistor. The transistor can be controlled open or short according to the signals of the control unit 208. When the control unit 208 sends forth a short signal (conduct signal), such as a high level or low level voltage signal, the foregoing transistor makes the switch circuit in an on-state and the power supply unit 203 supplies power to the display module 201 and the detecting unit 202. On the contrary, when the control unit 208 sends forth an open signal (turning off signal), such as a low level or a high level voltage signal which is the reverse of the short signal, the foregoing transistor makes the switch circuit in an off-state and the power supply unit 203 stop supplying power to the display module 201 and the detecting unit 202.

The display module 201 further comprises a third switch 2011 to make the display module 201 in an off-state as the image recording apparatus entering into power saving mode and stop the power supplied to the display module 201.

The voltage converter 206 is utilized to convert a voltage of the power supply unit 203 into varieties of voltage values of preset output voltage. The varieties of the voltage values of the preset output voltage are respectively appropriate for the display module 201 and the detecting unit 202. In this embodiment, a power IC chip can be illustrated for the voltage converter 206. Alternatively, a step up/step-down voltage circuit also can be illustrated.

The second switch 205 is coupled with the power supply unit 203 and the detecting unit 202 to determine open or short between the power supply unit 203 and the detecting unit 202. The second switch 205 can be a switch circuit which includes a transistor. The transistor can be controlled open or short according to the signals of the control unit 208. When the control unit 208 sends forth a short signal (conduct signal), such as a high level or low level voltage signal, the foregoing transistor makes the switch circuit in an on-state and the power supply unit 203 supplies power to the display module 201 and the detecting unit 202. On the contrary, when the control unit 208 sends forth an open signal (turning off signal), such as a low level or a high level voltage signal which is the reverse of the short signal, the foregoing transistor makes the switch circuit in an off-state and the power supply unit 203 stops supplying power to the detecting unit 202.

The input unit 207 is coupled with the control unit 208. The control unit 208 controls corresponding to inputs from the input unit 207. In this embodiment, the input unit 207 can be a keyboard or a button for providing a user to operate the image recording apparatus. According to the inputs from the keyboard or the button, the corresponding signals are generated to the control unit 208 for controlling correspondingly.

The control unit 208 comprises an interrupt unit 2081 and a process unit 2082. The interrupt unit 2081 receives a trigger of an external event. The process unit 2082 operates according to the trigger of the external event. When the image recording apparatus is activated, the control unit 208 controls the first switch 204 in an on-state to utilize the power supply unit 203 to supply power to the display module 201 and the detecting unit 202. The control unit 208 executes a corresponding operation according to the inputs of the input unit 207 and the detecting unit 202. After an idle status of the image recording apparatus exceeds a predetermined time, the control unit 208 disables the interrupt unit 2081 and controls the second switch 205 in an on-state and the first switch 204 in an off-state to utilize the power supply unit 203 to supply power to the detecting unit 202 via the second switch 205. After a default time, the control unit 208 enables the interrupt unit 2081.

The idle status represents that no signals are inputted into the control unit 208. The definition of the default time can be obtained by experiments. The experiments are measuring a time length of a transient pulse occurrence in circuits of the image recording apparatus for entering into sleep mode when control unit 208 controls the first switch from an on-state to an off-state. The time length of the transient pulse occurrence can be defined as the aforesaid default time and can be 1~3 seconds. The aforesaid corresponding operation executed by the control unit 208 can be, such as image browsing, system setting or image recording. The control unit 208 can be a DSP (Digital Signal Processor) or a MCU (Micro Control Unit). Alternatively, the control unit 208 can be a combination of a DSP and a MCU.

Figure 3:
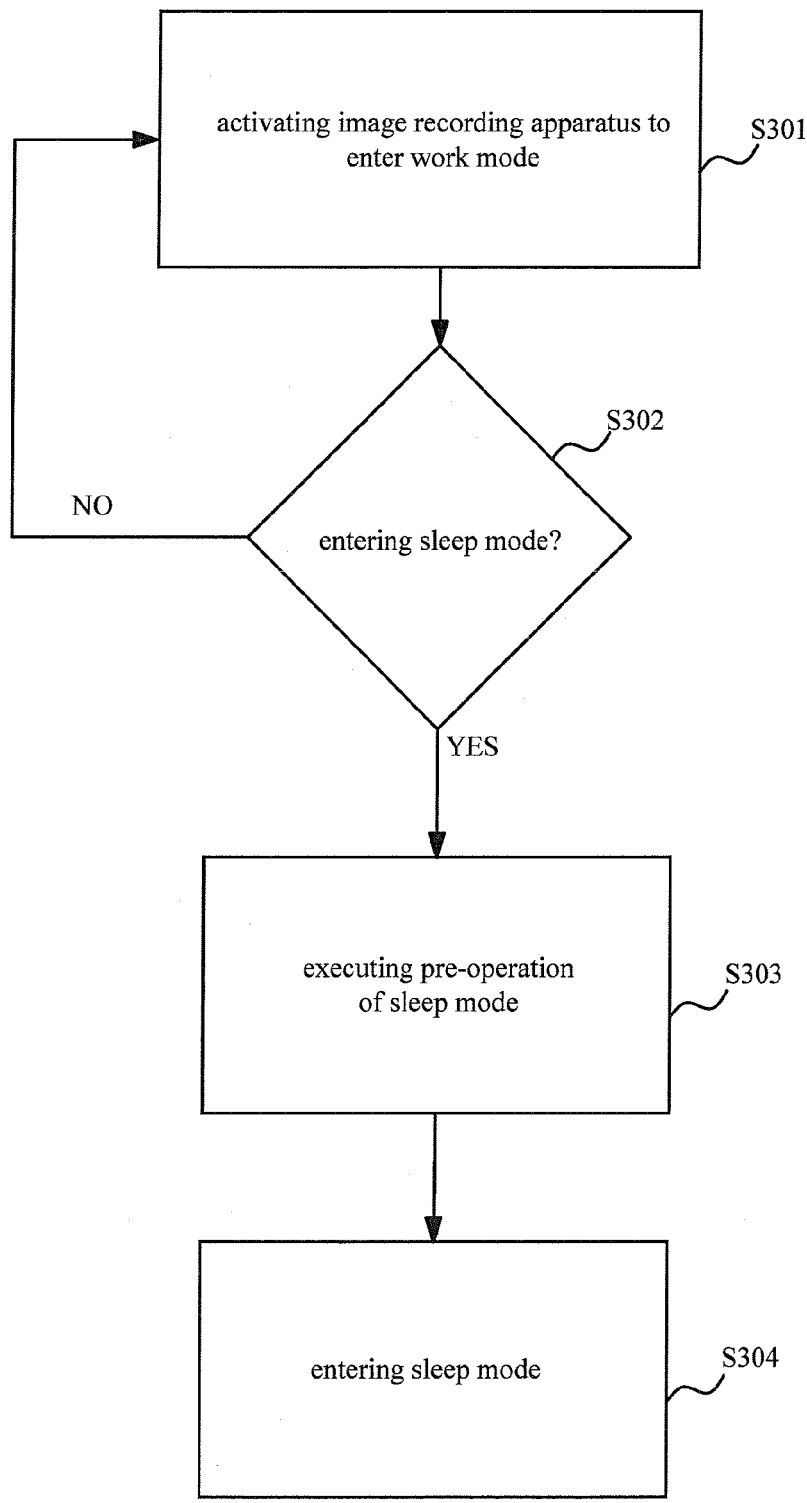
FIG. 3 depicts a flowchart of a control method of an image recording apparatus according an embodiment of the present invention.

Please refer to FIG. 3, which depicts a flowchart of a control method of an image recording apparatus according an embodiment of the present invention. The control method of the present invention comprises steps of:

Step 301, activating the image recording apparatus to enter into work mode;

Step 302, when in the work mode, confirming whether the image recording apparatus entering into sleep mode, if no, going back to Step 301 to continue the work mode and if yes, proceeding the Step 303;

Step 303, executing a pre-operation of the sleep mode after confirming that the image recording apparatus will enter into the sleep mode; and Step 304, entering into the sleep mode after the pre-operation is finished.

Figure 4:
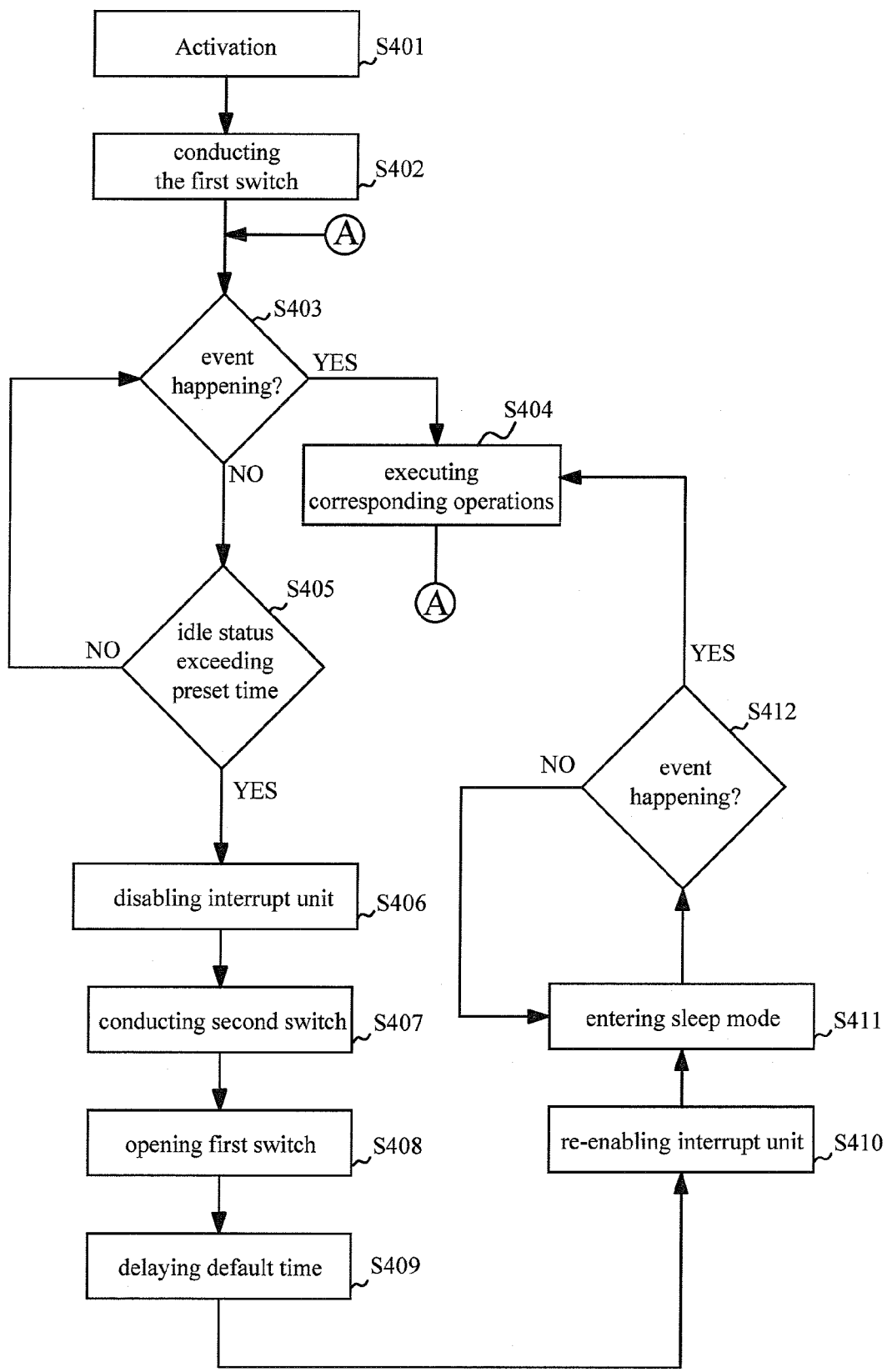
FIG. 4 depicts a detailed flowchart of a control method of an image recording apparatus according an embodiment of the present invention.

Please refer to FIG. 4, which depicts a detailed flowchart of a control method of an image recording apparatus according an embodiment of the present invention. Further detailed steps are described below:

Step 401, activation; activating the image recording apparatus.

Step 402, conducting the first switch 204 in an on-state (The image recording apparatus enters into the work mode); the control unit 208 sends forth a short signal (conduct signal) to the first switch 204 to control the first switch 204 in an on-state. With converting the voltage of the power supply unit 203 to an appropriate voltage by the voltage converter 206, the power supply unit 203 supplies power to the display module 201 and the detecting unit 202.

Step 403, confirming whether an event happens or not; if yes, proceeding to Step 404 and if no, proceeding to Step 405. During this step, the control unit 208 confirms whether any control signal of the foregoing event is inputted. When the control signal is inputted, the control unit 208 executes the corresponding operation of the control signal. Without any control signal inputted, the image recording apparatus is in idle status. The control unit 208 starts to count the passing time of the idle status.

Step 404, executing the corresponding operation according to various control signals;

Step 405, confirming whether a passing time of no inputs (the idle status) from the input unit 207 exceeds the predetermined time; if no, going back to the Step 403 and if yes, proceeding to Step 406. As control unit 208 counts the passing time of the idle status exceeding the predetermined time, the image recording apparatus enters into sleep mode.

Step 406, disabling the interrupt unit; this step is the pre-operation of the sleep mode that the control unit 208 generates commands of disabling the interrupt unit 2081 to ignore any input signals.

Step 407, conducting the second switch 205 in an on-state; this step is to switch the power supply from the work mode to the sleep mode. Therefore, the control unit 208 sends forth a short signal (conduct signal) to control the second switch 205 in an on-state and the power supply unit 203 supplies power to the detecting unit 202.

Step 408, turning off the first switch 204; this step is to stop power supply of the work mode. The control unit 208 sends forth an open signal (turning off signal) to control the first switch 204 in an off-state and the power supply unit 203 stops supplying power to the display module 201 and the detecting unit 202.

Step 409, delaying the default time; this step is to prevent false trigger of the detecting unit 202 caused by the transient pulse occurrence right as turning off the first switch 204. The control unit 208 delays the default time (The control unit 208 has no operations in the default time) after controlling the first switch 204 in an off-state.

Step 410, re-enabling the interrupt unit 2081; this step is to recover the function of the interrupt unit 2081. The control unit 208 re-enables the interrupt unit 2081 after the default time.

Step 411, entering into the sleep mode; this step is to drive the image recording apparatus entering into the sleep mode for power saving. The control unit 208 enters into the sleep mode. The detecting unit 202 is supplied power by the power supply unit 203 via the second switch 205.

Step 412, detecting whether an event happens or not; if no, continuing the sleep mode and if yes, going back to Step 404 to execute the corresponding operation. The aforesaid in-order steps is to detect whether any commands or triggers to activate the image recording apparatus. Therefore, the interrupt unit 2081 continuously detects any interrupt signals (the commands or the triggers) to make the control unit 208 enter into the work mode and executes the corresponding operation according to the aforesaid interrupt signals.

Figure 5:
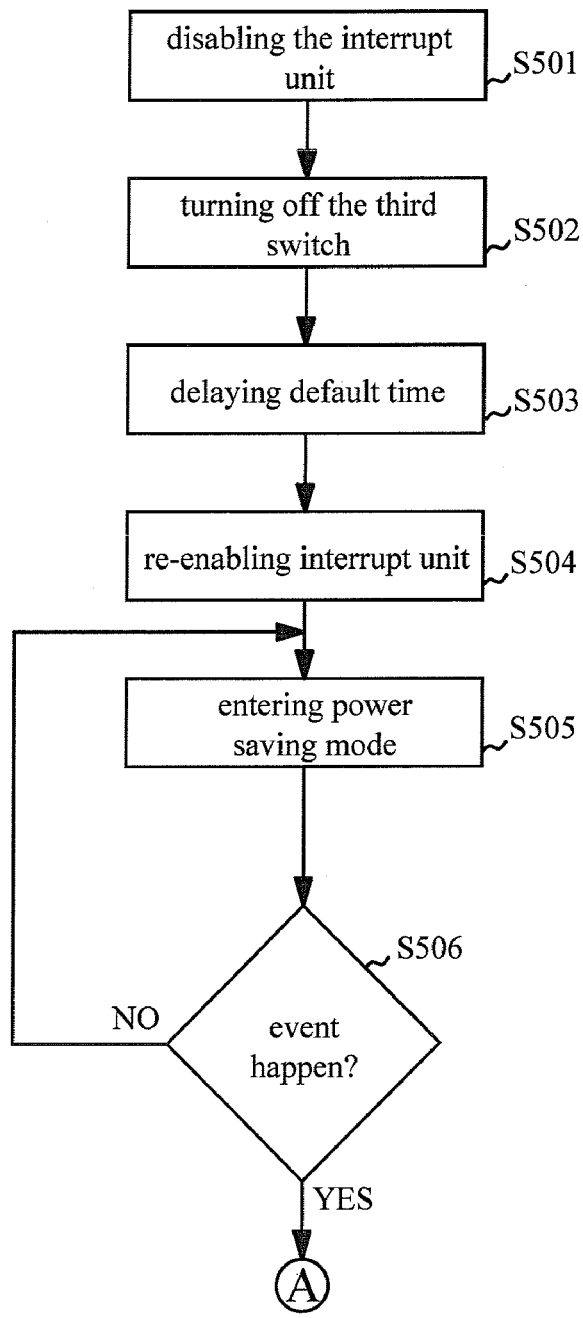
FIG. 5 shows a control method flowchart of an image recording apparatus according another embodiment of the present invention.

Please refer to FIG. 5, which depicts a control method flowchart of an image recording apparatus entering into power saving mode according another embodiment of the present invention. Similar steps as the embodiment related with the sleep mode is omitted herewith. When the idle status exceeds a predetermined time, the procedure of the control method of entering into the power saving mode is executed. The control method of the present invention comprises steps of:

Step 501, disabling the interrupt unit 2081; this step is pre-operation of power saving mode. The control unit 208 generates commands of disabling the interrupt unit 2081 to ignore any input signals.

Step 502, turning off the third switch 2011; this step is stop the power supply to the display module 201. The control unit 208 sends forth an open signal (turning off signal) to control the third switch 2011 in an off-state to stop the power supply unit supplying power to the display module 201.

Step 503, delaying the default time; this step is to prevent false trigger of the detecting unit 202 caused by the transient pulse occurrence right as turning off the third switch 2011. The control unit 208 delays the default time (The control unit 208 has no operations in the default time) after controlling in the third switch 2011 in an off-state.

Step 504, re-enabling the interrupt unit 2081; this step is to recover the function of the interrupt unit 2081. The control unit 208 re-enables the interrupt unit 2081 after the default time.

Step 505, entering into the power saving mode; this step is to drive the image recording apparatus entering into the power saving mode for power saving.

Step 506, detecting whether an event happens or not; if no, continuing the power saving mode and if yes, going back to Step 404 to execute the corresponding operation. The aforesaid in-order steps is to detect whether any commands or triggers to activate the image recording apparatus. Therefore, the interrupt unit 2081 continuously detects any interrupt signals (the commands or the triggers) to make the control unit 208 enter into the work mode and executes the corresponding operation according to the aforesaid interrupt signals.

Significantly, the difference of the sleep mode from the power saving mode is that all units and modules stop operations and power supply thereto but the detecting unit does not in the sleep mode. Distinctively, only particular modules stop operations and power supply thereto in the power saving mode. Although the display module and the third switch are illustrated in this embodiment, the control method of the present invention can be applied to one or more units/modules to enter into the power saving mode respectively or simultaneously.

The present invention obtains the time length of the transient pulse occurrence and sets the time length as the default time. Before the image recording apparatus enters into the sleep mode or the power saving mode, the control unit 208 disables the interrupt unit 2081 initially. The control unit 208 shuts down the power source of the work mode to the detecting unit 202 when the power source of the sleep mode was supplied. At present, the switch procedure causes the transient pulse. However, the interrupt unit 2081 is disabled, therefore, any input signals from the detecting unit 202 which triggers the control unit 208 can be ignored. Accordingly, any false triggers to the control unit 208 can be prevented. After the default time past, the time length of transient pulse elapsed. And then, the interrupt unit 2081 is re-enabled and the image recording apparatus enters into the sleep mode. Consequently, the image recording apparatus and control method thereof can efficiently prevent false trigger as entering into the sleep mode and insure correct operations of the image recording apparatus. Entering into the sleep mode smoothly to save consumption of electricity and promote efficacy of long-term power supply.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An image recording apparatus, capable of preventing maloperations when entering into sleep mode, comprising:

a display module, a detecting unit, a power supply unit, supplying power to the display module and the detecting unit;

a first switch, coupled with the display module, the detecting unit and the power supply unit, determining open or short between the power supply unit and the display module, between the power supply unit and the detecting module;

a second switch, coupled with the power supply unit and the detecting unit, determining open or short between the power supply unit and the detecting unit; and a control unit, further comprising an interrupt unit, receiving a trigger of an external event, wherein the control unit controls the first switch in an on-state to supply power to the display module and the detecting unit, disables the interrupt unit and controls the second switch in an on-state and the first switch in an off-state to supply power to the detecting unit via the second switch after an idle status of the image recording apparatus exceeds a predetermined time; and then enables the interrupt unit after a default time.

2. The image recording apparatus of claim 1, further comprising an input unit, coupled with the control unit, wherein the control unit proceeds controls corresponding to inputs from the input unit.

3. The image recording apparatus of claim 1, further comprising a voltage converter, converting a voltage of the power supply unit for supplying power to the display module and the detecting unit.

4. The image recording apparatus of claim 3, wherein the voltage converter is a power IC chip.

5. The image recording apparatus of claim 1, wherein the detecting unit further comprises a pyroelectric infrared sensor.

6. The image recording apparatus of claim 1, wherein the first switch is a switch circuit including a transistor.

7. The image recording apparatus of claim 1, wherein the second switch is a switch circuit including a transistor.

8. The image recording apparatus of claim 1, wherein the idle status represents that no signals are inputted into the control unit.

9. The image recording apparatus of claim 1, wherein the default time is longer than a time length of a transient pulse occurrence.

10. The image recording apparatus of claim 1, wherein the default time is 1~3 seconds.

11. A control method of an image recording apparatus, the image recording apparatus comprising a display module having a detecting unit, a power supply unit, a first switch, a second switch and a control unit having an interrupt unit, the control method comprising steps of:

confirming whether an idle status of the image recording apparatus exceeds a predetermined time in work mode; and executing a pre-operation of sleep mode when exceeding the predetermined time, wherein the pre-operation of sleep mode further comprises steps of:

disabling the interrupt unit;

controlling the second switch in an on-state, then controlling the first switch in an off-state to supply power to the detecting unit via the second switch with the power supply unit; and enabling the interrupt unit after controlling the first switch in the off-state in a default time.

12. The control method of claim 11, further comprising steps of:

activating the image recording apparatus to enter into the work mode before the confirming step; and generating a trigger of an event during the sleep mode for entering into the work mode.

13. The control method of claim 11, wherein the control unit counts a passing time of no inputs from the input unit and compares the passing time with the predetermined time to confirm whether the idle status of the image recording apparatus exceeds the predetermined time during the confirming step.

14. The control method of claim 13, wherein the step of disabling the interrupt unit further comprises a step of generating a command by the control unit for disabling the interrupt unit.

15. The control method of claim 11, wherein the default time is longer than a time length of a transient pulse occurrence.

16. The control method of claim 11, wherein the default time is 1~3 seconds.

17. A control method of an image recording apparatus, the image recording apparatus comprising a display module having a third switch, a power supply unit, and a control unit having an interrupt unit, the control method comprising steps of:

confirming if an idle status of the image recording apparatus exceeds a predetermined time in work mode; and executing a pre-operation of power saving mode as exceeding the predetermined time, wherein the pre-operation of power saving mode further comprises steps of:

disabling the interrupt unit;

controlling the second switch in an on-state, then controlling the first switch in an off-state to supply power to the detecting unit via the second switch with the power supply unit; and enabling the interrupt unit after controlling the first switch in the off-state in a default time.

18. The control method of claim 17, further comprising a step of:

generating a command by the control unit for disabling the interrupt unit.

19. The control method of claim 17, wherein the default time is longer than a time length of a transient pulse occurrence.

20. The control method of claim 17, wherein the default time is 1~3 seconds.

* * * * *